United States Patent

[11] 3,557,767

| [72] | Inventor | Roger E. Green<br>Fort Wayne, Ind. |
|---|---|---|
| [21] | Appl. No. | 840,648 |
| [22] | Filed | July 10, 1969 |
| [45] | Patented | Jan. 26, 1971 |
| [73] | Assignee | International Harvester Company<br>Chicago, Ill.<br>a corporation of Delaware |

[54] OIL ANTI-DRAINBACK DEVICE WITH BYPASS
10 Claims, 2 Drawing Figs.

[52] U.S. Cl. .................................... 123/196,
184/1.5, 184/6, 210/168
[51] Int. Cl. ...................................... F01m 1/10,
F16n 33/00
[50] Field of Search ........................................ 184/1.5,
6H, 6A, 6S; 210/168; 123/196A

[56] References Cited
UNITED STATES PATENTS

| 2,253,686 | 8/1941 | Burckhalter................ | 210/168 |
| 2,801,006 | 7/1957 | Hultgren et al. ............ | 184/6X |
| 2,897,966 | 8/1959 | Humbert, Jr. ............... | 184/6X |
| 2,976,864 | 3/1961 | Ford............................ | 184/6X |
| 2,983,336 | 5/1961 | Kolbe.......................... | 184/6 |
| 3,087,582 | 4/1963 | Potter......................... | 184/6 |

*Primary Examiner*—Manuel A. Antonakas
*Attorney*—Noel G. Artman

ABSTRACT: An oil filter assembly for an internal combustion engine effective to direct lubricating oil to the bearings and to the cylinder head area of the engine. The assembly includes a pressure actuated check valve effective to trap the lubricating fluid in the cylinder head area when the engine is turned off. The assembly also includes a bypass conduit and a sealing land incorporated on the filter element to normally close the bypass conduit. Oil from the cylinder head area is drained through the bypass conduit when the filter element is removed.

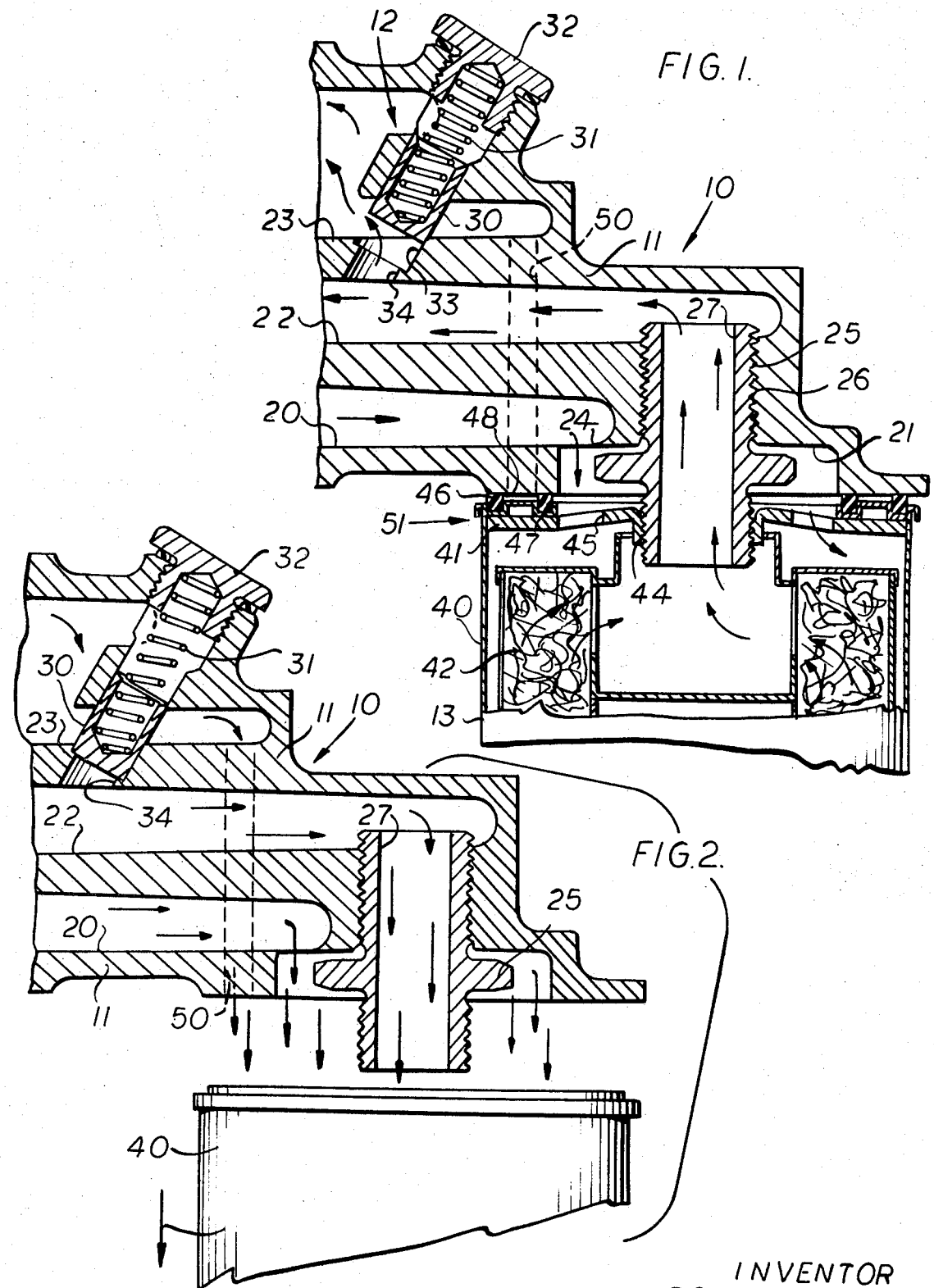

OIL ANTI-DRAINBACK DEVICE WITH BYPASS

BACKGROUND OF THE INVENTION

This invention relates to internal combustion engines and more particularly to lubrication systems for such engines.

Nearly all internal combustion engines of the reciprocating piston type include some form of lubricating oil circulating system which directs lubricating oil to the bearings on the crankshaft and to other frictional wear surfaces within the engine. Such oil circulating systems frequently include a filter which is effective to trap dirt and other particulate matter that may be formed within or enter the engine. Replaceable filter elements for such systems are commercially available and are periodically replaced when the lubricating oil is changed.

In some internal combustion engines, it is desirable that lubricating oil be available immediately for lubricating the cylinder head area when the engine is being started. For this purpose, it is desirable to trap a portion of the lubricating oil in this area when the engine is turned off so that it will be available on restarting. It is also desirable to replace all of the lubricating oil during a regular oil change.

SUMMARY OF THE INVENTION

It is an object of the present invention to provide a lubricating oil circulating system for an internal combustion engine and including an oil filter assembly effective to direct lubricating oil to the bearings and to the cylinder head portion of the engine. The system includes a pressure actuated spring-loaded check valve which opens when circulating oil pressure is present to allow the passage of oil to the cylinder head area. The check valve closes due to spring pressure when the engine stops and traps a portion of the lubricating oil in the cylinder head area so that it will be available immediately when the engine is restarted.

It is another object to provide an oil filter assembly formed with an oil bypass conduit around the check valve, the bypass being normally closed by an oil pressure sealing land.

A further object is to provide on an associated filter element a sealing land to normally close the oil bypass conduit. The sealing land is attached to the filter element and removal of the latter during an oil change opens the bypass conduit and permits the draining of lubricating oil normally trapped by the check valve.

DESCRIPTION OF THE DRAWINGS

FIG. 1 is a sectional view of the filter assembly of the present invention and showing a lubricating oil flow diagram for an engine in running condition; and FIG. 2 is a sectional view of the filter assembly when the engine is stopped and the filet element is removed.

DESCRIPTION OF THE PREFERRED EMBODIMENT

The oil filter assembly of the present invention is designated generally by the numeral 10 and comprises a housing 11, a check valve 12, and a filter element 13 as part of the lubricating oil circulating system. The housing 11 is formed with an inlet conduit 20, an annular cavity 21, and outlet conduits 22 and 23. The inlet conduit 20 is connected to an oil pump (not shown) which acts as a source of fluid pressure for the engine oil circulating systems. The conduit 20 opens into the annular cavity 21 through a port 24 and lubricating oil passing from the inlet conduit 20 flows through the cavity 21 into the filter element 13.

A hollow double-ended coupling 25 is threaded into a mating aperture 26 formed in the housing 11 and serves as a means for attaching the filter element 13 to the housing 11. Oil that has passed through the filter element 13 passes through a central bore 27 of the coupling 25 into the outlet conduit 22. The conduit 22 communicates with and directs oil to the bearings of the engine (not shown).

The check valve 12 comprises a piston 30, a spring 31, and a spring retaining nut 32. The piston 30 is movable longitudinally through a bore 33 formed in the housing 11 and is spring biased to seat against and close a port 34 by the spring 31. The port 34 connects the outlet conduits 22 and 23. When the engine is running and oil pressure is present in the conduit 22, this pressure forces the piston 30 off the port 34 and allows oil to pass into the conduit 23. The outlet conduit 23 directs oil to the upper cylinder head area (not shown) of the engine. When the engine is turned off, the oil pressure from the pump drops and the valve piston 30 seats to close off the port 34 and trap the lubricating oil in the upper cylinder head area.

The filter element 13 may comprise a cylindrical outer shell 40, an upper end plate 41, and a cylindrical filter core 42. The end plate 41 is formed with a threaded central aperture 44 for attachment to the coupling 25. A plurality of ports 45 are also formed in the end plate 41 and they open into the cavity 21. When oil pressure exists in the inlet conduit 20, the oil flows through the port 24 and annular cavity 21 and ports 45 into the interior of the shell 40. Oil passes downward around the filter core 42 and upward through the filter core 42 into the central bore 27 of the coupling 25 and thence into the outlet conduit 22 as indicated by the arrows in FIG. 1.

The upper face of the plate 41 carries two concentric sealing rings 46 and 47 which define an annular fluid cavity 48 between them and form a fluid tight face seal against the housing 11.

The housing 11 is formed with a bypass conduit 50 which connects the outlet conduit 23 with the cavity 48. When the filter element 13 is properly attached to the housing 11 by threading it onto the coupling 25, no oil is permitted to pass through the conduit 50, and the oil remains trapped in the upper cylinder head area. However, when the filter element 13 is removed, as is commonly done during an oil change, the fluid trapped in the upper cylinder head area by the check valve 12 is permitted to drain out through the bypass conduit 50. This ensures that all of the old oil is removed from the engine.

In this embodiment, the sealing rings 46 and 47 of filter element 13 act as a sealing land or valve 51 to prevent the escape of trapped oil in the conduit 23. This valve 51 is opened when the filter element 13 is removed and the conduit 50 is permitted to drain as shown in FIG. 2.

The embodiment shown and described is by way of example only and the invention is not to be considered as limited thereto except insofar as the claims may be so limited, and it is to be understood that changes may be made thereto without departing from the spirit of the invention.

I claim:

1. In an internal combustion engine lubricating oil circulating system having an oil pressure source that is operable when the engine is running to supply lubricating oil under pressure to various areas of the engine requiring lubrication, the combination comprising:

means providing fluid communication between the oil pressure source and an area of the engine requiring lubrication, including first conduit means; check valve means at one end of said first conduit means, said check valve means being effective to open when the engine is running and to close upon stopping of the engine for preventing oil from flowing through said first conduit means from said area of the engine requiring lubrication toward the oil pressure source;

second conduit means, said second conduit means being conditional to provide fluid communication between said area of the engine requiring lubrication and a point exteriorly of the engine; and means cooperable with said second conduit means for selectively conditioning said second conduit means for preventing and permitting draining of oil from said area of the engine requiring lubrication to said point exteriorly of the engine through said second conduit means.

2. In an internal combustion engine lubricating oil circulating system as set forth in claim 1, wherein said first and second conduit means are formed in a housing portion of the engine, one end of second conduit means opening into surface of said housing portion, and said means cooperable with said second conduit means for selectively conditioning said second conduit means for preventing and permitting draining of oil from said area of the engine requiring lubrication to said point exteriorly of the engine includes manually operable valve means adjacent said surface for closing and opening the opening of said second conduit means into said surface.

3. In an internal combustion engine lubricating oil circulating system as set forth in claim 2, wherein said means providing fluid communication between the oil pressure source and an area requiring lubrication further includes a filter assembly said valve means being associated with said filter assembly; and means for detachably securing said filter assembly to said housing portion of the engine adjacent said surface thereof, said valve means being effective to close said opening of said second conduit into said surface when said filter element is secured to said housing portion of the engine.

4. In an internal combination engine lubricating oil circulating system as set forth in claim 3, wherein said valve means comprises sealing land means carried by a generally flat, imperforate surface of said filter assembly, said sealing land means encircling said opening of said second conduit into said surface and abutting said housing portion surface when said filter assembly is secured to said housing portion of the engine.

5. In an internal combustion engine lubricating oil circulating system as set forth in claim 4, wherein said filter assembly includes a disposable filter element and a filter housing for said filter element, said filter assembly being provided with oil inlet means and oil outlet means, said oil inlet means being in fluid communication with the oil pressure source and said oil outlet means being in fluid communication with one end of said first conduit means when said filter assembly is attached to said housing portion of the engine.

6. In an internal combustion engine lubricating oil circulating system as set forth in claim 1, wherein said means providing fluid communication between the oil pressure source and an area of the engine requiring lubrication further includes a filter assembly, said filter assembly being interposed between one end of said first conduit means and the oil pressure source.

7. In an internal combustion engine lubricating oil circulating system as set forth in claim 6, including
   means for detachably securing said filter assembly to the engine; and
   said means cooperable with said second conduit means for selectively conditioning said second conduit means for preventing and permitting draining of oil from said area of the engine requiring lubrication to said point exteriorly of the engine includes valve means associated with said filter assembly, said valve means conditioning said second conduit means for preventing draining of oil from said area of the engine requiring lubrication to said point exteriorly of the engine when said filter assembly is secured to the engine.

8. In an internal combustion engine lubricating oil circulating system as set forth in claim 7, wherein said valve means comprises sealing land means, said sealing land means being interposed between said filter assembly and one end of said second conduit means for closing said second conduit means when said filter assembly is secured to the engine.

9. In an internal combustion engine lubricating oil circulating system having an oil pressure source that is operable when the engine is running to supply lubricating oil under pressure to various areas of the engine requiring lubrication, the combination comprising:
   oil supply conduit means providing fluid communication between the oil pressure source and an area of the engine requiring lubrication including an intermediate separable conduit portion; oil drain conduit means conditional to provide fluid communication between said area of the engine requiring lubrication and a point exteriorly of the engine; and
   oil flow control means cooperable with said oil drain conduit means for selectively conditioning said oil drain conduit means for preventing and permitting draining of oil from said area of the engine requiring lubrication to said point exteriorly of the engine through said oil drain conduit means, said oil flow control means being associated with said separable conduit portion and being effective to disestablish fluid communication between said area of the engine requiring lubrication and said point exteriorly of the engine when said separable conduit portion is a part of said oil supply conduit means and is not separated therefrom.

10. In an internal combustion engine lubricating oil circulating systems as set forth in claim 9, wherein:
   said oil drain conduit means is formed in a portion of said engine and has an outlet opening into a wall surface thereof:
   said separable conduit portion includes a filter assembly detachably securable to the engine; and
   said oil flow control includes an imperforate wall surface of said filter assembly, said imperforate wall surface being positioned over and closing said outlet opening of said oil drain means when said filter assembly is secured to the engine.